United States Patent [19]
Oeftering

[11] Patent Number: 5,520,715
[45] Date of Patent: May 28, 1996

[54] DIRECTIONAL ELECTROSTATIC ACCRETION PROCESS EMPLOYING ACOUSTIC DROPLET FORMATION

[75] Inventor: Richard C. Oeftering, Elyria, Ohio

[73] Assignee: The United States of America as represented by the Administrator of the National Aeronautics and Space Administration, Washington, D.C.

[21] Appl. No.: 278,724

[22] Filed: Jul. 11, 1994

[51] Int. Cl.⁶ ..................................................... B06B 1/20
[52] U.S. Cl. ............................ 75/335; 75/345; 427/565; 427/600
[58] Field of Search .................. 75/335, 345; 148/99; 427/458, 475, 560, 565, 600; 164/46

[56] References Cited

U.S. PATENT DOCUMENTS

| | | | |
|---|---|---|---|
| 4,346,387 | 8/1982 | Hertz et al. | 346/1.1 |
| 4,966,737 | 10/1990 | Werner et al. | 264/14 |
| 5,086,972 | 2/1992 | Chang et al. | 239/3 |
| 5,140,937 | 8/1992 | Yamane et al. | 118/695 |
| 5,171,360 | 12/1992 | Orme et al. | 164/46 |
| 5,257,657 | 11/1993 | Gore | 164/46 |
| 5,266,093 | 12/1993 | Chun et al. | 75/335 |
| 5,399,388 | 3/1995 | Aklufi | 427/565 |

FOREIGN PATENT DOCUMENTS

| | | | |
|---|---|---|---|
| 1-191706 | 8/1989 | Japan | 75/335 |
| 2-55139 | 2/1990 | Japan . | |
| 1682039 | 10/1991 | U.S.S.R. | 75/335 |

OTHER PUBLICATIONS

Paper: additional Information on the D.E.A.P. Process development at N.A.S.A. Lewis Research Center. Jul. 12, 1993.

*Primary Examiner*—George Wyszomierski
*Attorney, Agent, or Firm*—Vernon E. Williams; Susan Reinecke; Kent N. Stone

[57] ABSTRACT

The present invention is directed to an apparatus for manufacturing a free standing solid metal part. In the present invention metal droplets are produced from a free surface pool of molten metal is when an acoustic wave impacts an acoustic lens that is contiguous with the free standing pool of molten metal. The metal droplets are then charged and deflected toward a target. The build up of the metal droplets combine to form the free standing solid metal part.

3 Claims, 10 Drawing Sheets

DIRECTIONAL ELECTROSTATIC ACCRETION PROCESS EMPLOYING ACOUSTIC DROPLET FORMATION

ORIGIN OF THE INVENTION

The invention described herein was made by employees of the United States Government and may be manufactured and used for the Government for governmental purposes without the payment of any royalties thereon or therefore.

FIELD OF THE INVENTION

The present invention is directed to a method and apparatus for manufacturing free standing metal products. Some of the familiar Prior art techniques for creating metal products include, casting, extrusion, and powdered metallurgy. After the initial metal product is formed in the prior art, forming techniques, extractive techniques, chemical etching and additive or deposition techniques are also performed to bring the product to final form.

Casting is usually performed by pouring molten metal into a mold and letting it cool and solidify. The metal takes the shape of the mold's interior surface as it solidifies. In extrusion semi-molten metal is forced through an extrusion die which has a predetermined two dimensional shape. The extruded metal takes the shape of the die and the shape of the die is transferred to the product through contact. In powdered metallurgy a batch of solid metal particles or powder is poured into a mold where high temperature and pressure are applied to fuse or sinter the particles together. As is the case with casting the end product assumes the shape of the mold's interior surface.

After these initial products are produced, forming techniques, extractive techniques, chemical etching, and additive or depositive techniques are used to bring the product to the final form. In addition metal products can also be produced and brought to final form by creating the products out of preformed component parts which are then joined together. The components are finished by welding, soldering or brazing, the final product is put together using a molten filler material.

However many of these techniques have disadvantages. The molded form technique requires the mold be manufactured before the intended end product can be produced. In extractive techniques much of the material is discarded. Metal fabrication by welding, soldering and brazing require that the component parts be preformed before the final joining operation. In addition, in places that are physically remote from the specialized facilities required for molding, machining and deposition operations, such as Space, the use of such prior art is not feasible due to the size and mass of the equipment required for complexity the operations.

It is therefore an object of the present invention to produce products that are formed without molds or other contour forming tools and their related supporting hardware.

It is another object of the present invention to create a process that is capable of creating a variety of forms using only electric power, raw stock materials, and a set of product description parameters.

It is still another object of the present invention that the product be created with a minimum number of steps.

It is still a further object of the present invention that the process takes design data directly from the design workstation and converts the information into droplet accretion control parameters.

It is still yet a further object of the present invention that the process be completed without the need for high power and physically massive machinery.

It is still yet a another object of the present invention that the process be compatible with the vacuum and low gravity environment of space.

It is still yet another object to eliminate or minimize the tooling cost of producing a new product and make small quantity productions more effective in cost and time.

It is still a further object of the present invention that the process provides the flexibility to produce a great variety of products without retooling.

DESCRIPTION OF RELATED ART

U.S. Pat. No. 4,346,387 to Hertz is directed to a method and apparatus for controlling the electric charge on liquid droplets used in ink jet printing. U.S. Pat. No. 5,140,937 to Yamane et al. is directed to a method and apparatus for forming a three dimensional article with thermosetting material. U.S. Pat. No. 5,086,972 to Chang et. al. discloses an electrostatic paint depositing method and apparatus. U.S. Pat. No. 4,966,737 to Werner et. al. discloses a method and apparatus for manufacturing a powder of amorphous ceramic or metallic particles in a high pressure autoclave. Japanese Patent Publication No. 2-55139 to Nakazawa discloses a nozzleless ink jet recorder which efficiently prints and eliminates the stop of ink ejection due to clogging.

SUMMARY OF THE INVENTION

The present invention is directed to a directional electrostatic accretion process (DEAP) for manufacturing free standing metal products by accreting them from minute droplets of molten metal using a nozzleless acoustic device. The process is a single step manufacturing process that converts raw material and design information directly into an end product without intervening steps or post processing.

BRIEF DESCRIPTION OF THE DRAWINGS

The objects, advantages, and novel features of the invention will be more fully apparent from the following detailed description when read in connection with the accompanying drawings in which.

DESCRIPTION OF THE PREFERRED EMBODIMENT

Figure 1:
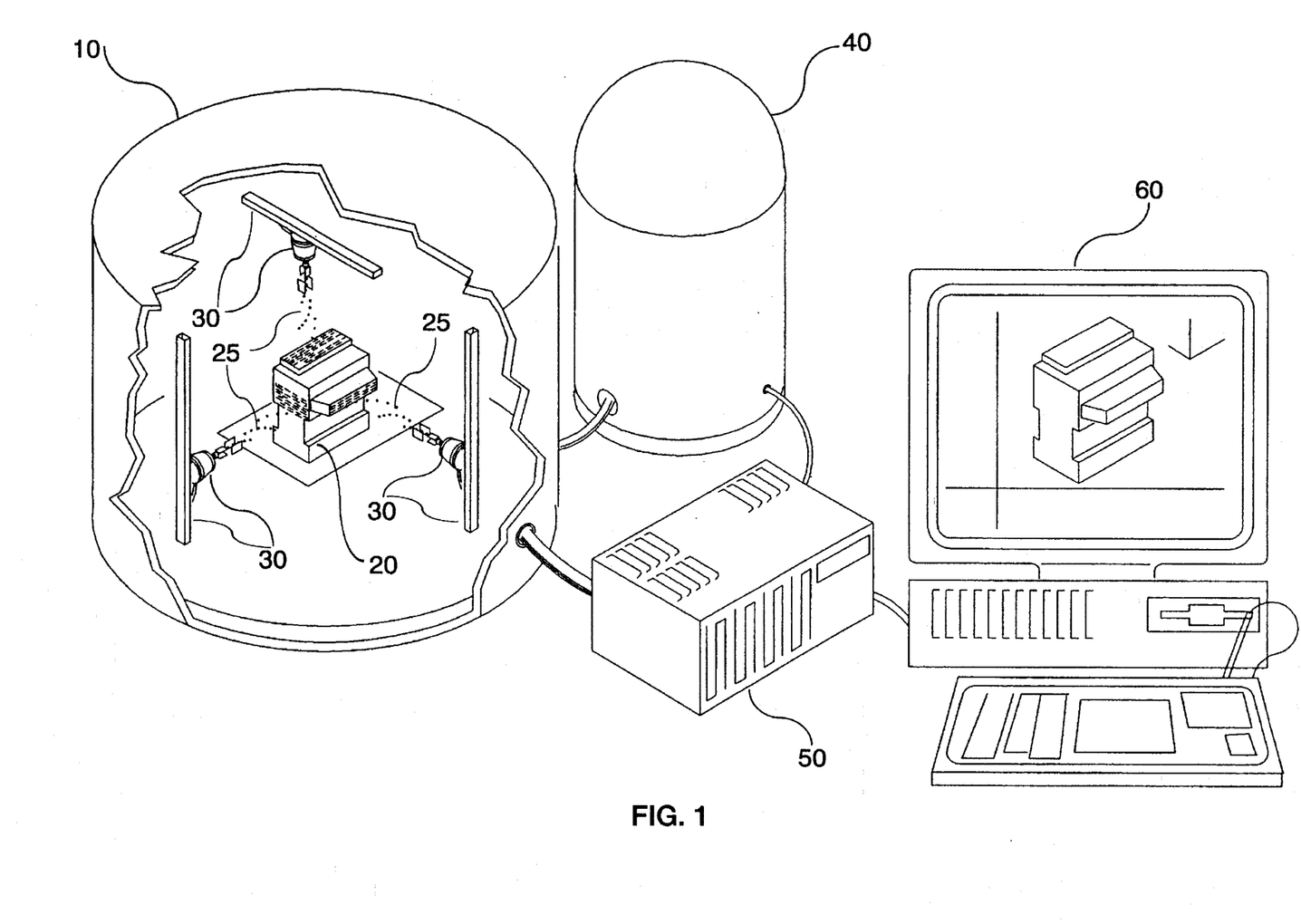
FIG. 1 displays a schematic drawing of the Directional Electrostatic Accretion Process (DEAP) manufacturing system.

FIG. 1 displays a conceptual drawing of the overall Directional Electrostatic Accretion Process (DEAP). In FIG. 1 an evacuated process chamber 10, houses an accretion product 20 which is being bombarded by liquid metal droplets 25, released from a droplet generator 30. The droplet generator 30 is provided with a constant supply of molten metal from a molten metal supply 40. A DEAP control 50 is used to control the release of the droplets 25 from the droplet generator 30 on demand. The DEAP control unit 50 is also fed with parameters from a DEAP design workstation 60. The parameters include droplet sizes, impact locations, velocity which are derived from the products dimensional description and pertinent physical and material properties.

All the activity of the DEAP manufacturing system are coordinated by the DEAP design workstation 60 or a equivalent control system. The accretion control parameters govern the operation of the process and are contained within the DEAP design workstation 60. These parameters are generated by a DEAP design data processing program which is housed in the DEAP Design Workstation 60. This program converts a general DEAP product description file into a set of accretion system control parameters(which consist of droplets generator parameters, deflection system parameters and accretion parameters. The droplet generator parameters include the acoustic frequency and burst duration and amplitude for each droplet. The accretion parameters include, pool temperature, and target surface temperature. The deflection system parameters include, charging voltage, deflection voltage and, optional acceleration voltages for each droplet accretion control parameters). Therefore, for every droplet emitted there is a set of DEAP control parameters.

Figure 2:
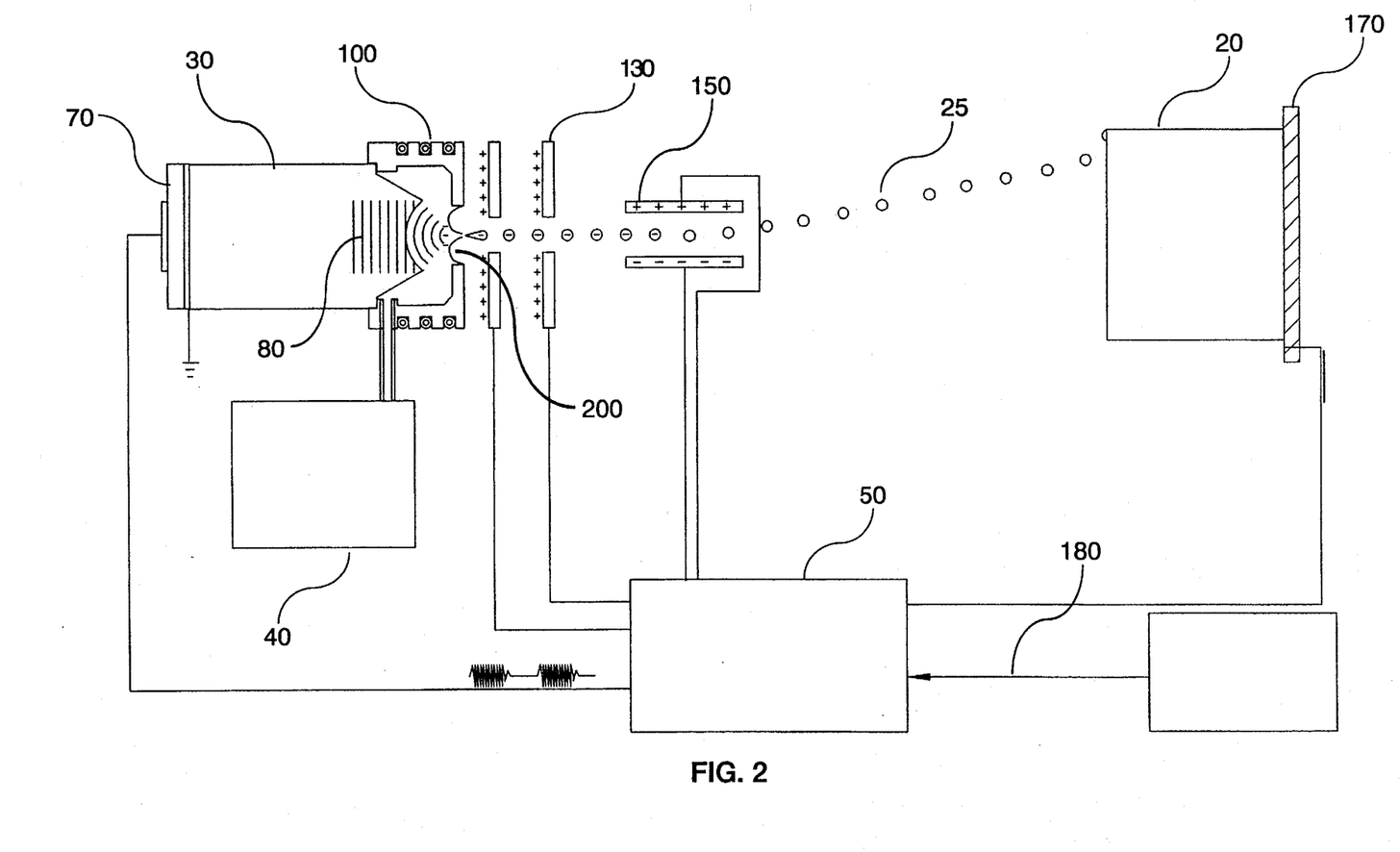
FIG. 2 displays a schematic of the Directional Electrostatic Accretion Process.

FIG. 2 displays the four primary components of the DEAP manufacturing system. The droplet generator 30, the electrostatic trajectory control 150, the accretion target 170, and the DEAP process controller 50. The droplet generator 30 is provided with a reservoir of molten liquid 280 which is maintained in the molten state by the heating of the heating elements 100. For normal operation of the DEAP manufacturing system, a piezoelectric transducer 70 generates a series of acoustic waves 80 (referred to as a tonal burst) which causes a droplet to be produced. The droplet is charged before it leaves the reservoir of molten liquid 280 by a charge electrode 120. The new charged droplet 140, may then be accelerated by an optional acceleration electrode 130. Once the droplet 140 passes through the acceleration electrode 130 it is deflected by the deflection plates 150 toward a predetermined position on the target 170. The DEAP electrostatic trajectory controller 50 varies the voltage on the deflection plates 150 based on the accretion parameters 180 transmitted from the DEAP design workstation 60. Therefore the accretion parameters 180, control the parameters of the system so that each droplet 25 hits the exact spot on the accretion product 20 that is required to form the product.

The droplet generator 30 uses piezoelectric acoustic transducers 70 which are sensitive to high temperatures. Therefore a means of insulating the piezoelectric device from the hot metal is requiredAs the droplets separate from the droplet generator 30, the droplet experiences the electrostatic field produced by the charge electrode 120. As a result, the droplet 140 acquires an induced charge of opposite polarity of that of the charge electrode. Once charged, the droplet 140 can be accelerated or decelerated along its initial trajectory by the accelerating electrode 130. In addition, the droplet 140 can be accelerated in a direction perpendicular to the initial trajectory resulting in a deflection, by the deflecting plates 150. By manipulating the electrostatic field strength of the charge electrode and the deflection plates 150 the amount of electrostatic charge acquired and the degree of deflection or acceleration can be controlled.

The droplet 140 is eventually directed to the accretion target 170 which is the substrate that supports the initial layers of accretion product 20. This target 170 may become an integral part of the end product or the target 170 may have a treated surface that can be separated from the accretion mass so that the target 170 can be reused for the next product.

The use of the nozzleless technique involves the use of free surface pools pinned by surface tension. A pinned free surface pool was validated in actual space experiments. The pool depth must be maintained to within the focus region within one acoustic wavelength of the ideal ejection depth. Maintaining depth of an unpressurized pool, where filling and draining are required, is best accomplished by employing surface tension and acoustic radiation pressure. Conventional displacement devices in a vacuum unopposed by external pressure have not proven to be reliable. Capillary action of a meniscus is used in conjunction with radiation pressure to drive the pool's replenishment and level control. Since the acoustic droplet generator design is similar with acoustic measuring devices the droplet generator's transducer may also be used for acoustic depth sensing as a means of pool depth feedback measurement. The signal can be processed and the DEAP control system may then regulate the pool depth automatically either through conventional displacement means or by using an acoustic radiation pump.

Figure 3:
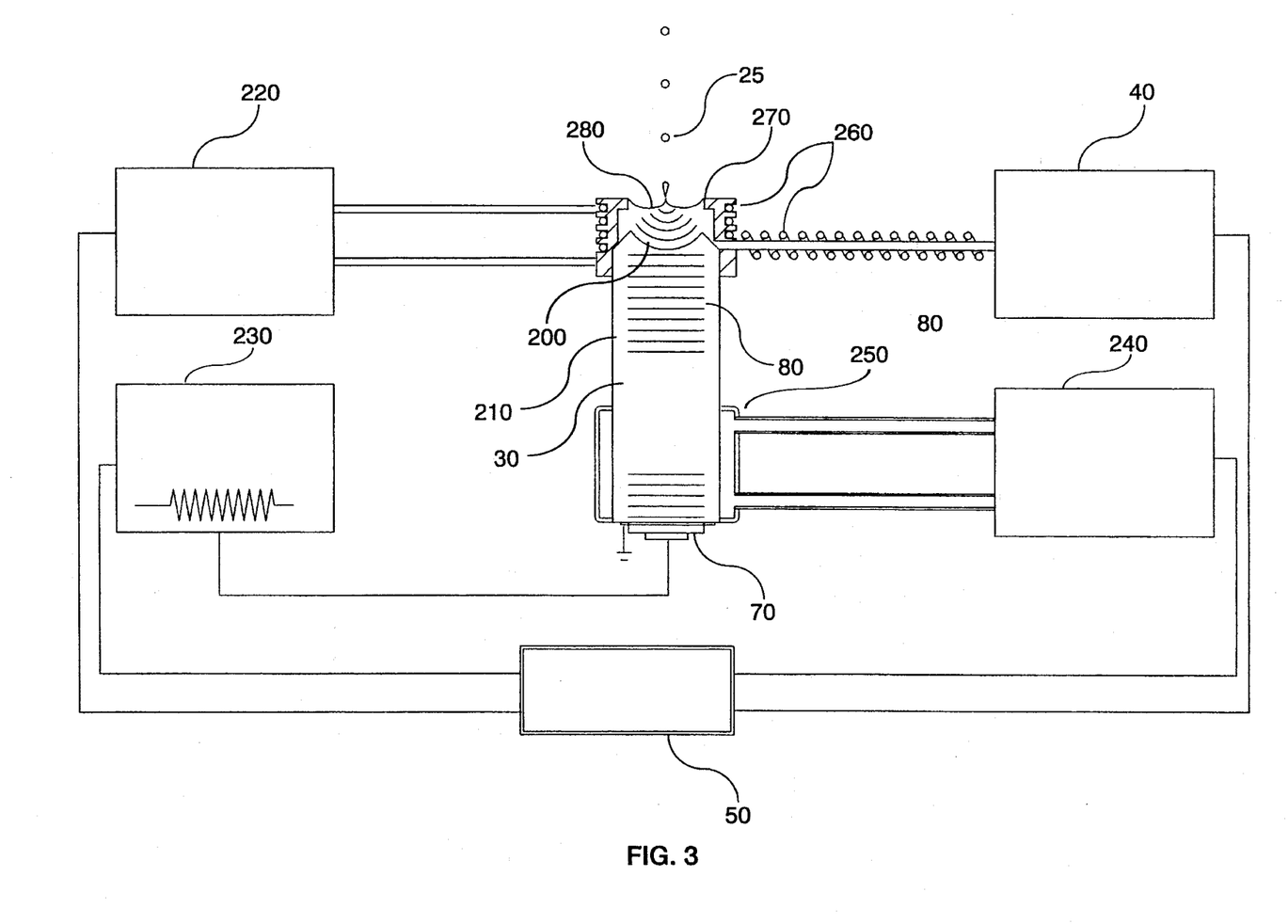
FIG. 3 displays the acoustic droplet generator.

FIG. 3 displays a schematic of the acoustic droplet generator. The droplet generator 30 contains a small free surface reservoir pool of molten metal 280 sufficient to sustain the droplet generation process. The droplet generator reservoir 280 is kept full by an external material source 40 that replenishes the reservoir to maintain a fixed operating pool depth. The droplet generator 40 produces single droplet of molten metal 25. These droplets 25 are produced on command and have a predetermined size and initial velocity. The droplet is ejected from the reservoir 280 by a focused beam of acoustic energy 80. The reservoir 280 is held in place by surface tension which maintains the reservoir particularly in zero gravity where surface tension would be the dominant force. The edge of the reservoir 270 is treated with a material that resist wetting by the liquid. Therefore the molten metal does not leave the reservoir 280 and flow beyond the edge of the reservoir 270. For small pools (<1 mm) this "pinned" condition permits the droplet generator to operate in any orientation even in 1 g. The droplet generator 30 is heated by the heater control 220 using the heater elements 260. The droplet generator 30 is held at a high temperature to assure that the metal remains a liquid while in the reservoir 280 and to assure that the droplets produced do not solidify prior to impact on the target. The temperature required is governed by the thermal properties of the particular metal being used, the trajectory length, droplet speed and size, and the thermal environment.

A buffer rod 210 is used to permit the acoustic energy to reach the liquid metal reservoir 280 while isolating the piezoelectric material from the high temperatures. The buffer rod 210 may rely on radiative heat transfer to dissipate heat for relatively low temperatures or a cooling jacket may be provided for high temperatures. The energy is first produced by an electrical tone burst generator 230, the electrical energy is then transferred to the piezoelectric transducer 70, which then converts it to acoustic energy and which then transmits the acoustic energy through the buffer rod 210 in the form of acoustic-tone burst 80. The buffer rod transmits the acoustic waves of the tone burst to an acoustic focusing lens 200. The acoustic focusing lens 200 is coupled with the liquid metal reservoir 280, therefore the acoustic wave 80 is transmitted through the acoustic focusing lens 200 to the liquid metal reservoir 280. The acoustic focusing lens 200 is also physically shaped so that when the acoustic wave transmits through the acoustic focusing lens 200 it is focused to a point at the surface of the molten reservoir 280, where the acoustic wave 80 produces a region of acoustic radiation pressure which acts on the surface for the duration of the acoustic tone burst. The acoustic radiation pressure at the focus that causes the droplet to eject. If the acoustic lens provides a high quality focus the droplet formed will be proportional to the acoustic wavelength in the liquid metal. Thus, the droplet size is directly related to the frequency of the tone burst. A metal such as gallium would produce a typical droplet size of 20 to 100 microns with a frequency of 140 megahertz to 28 megahertz.

Ejection of liquid metal may be hindered by the formation of an oxide skin that forms in an oxygen environment. The oxide skin absorbs the acoustic energy while impeding droplet ejection. It is necessary to operate the apparatus in a vacuum or oxygen free atmosphere to eliminate oxide skin formation.

Figure 6:
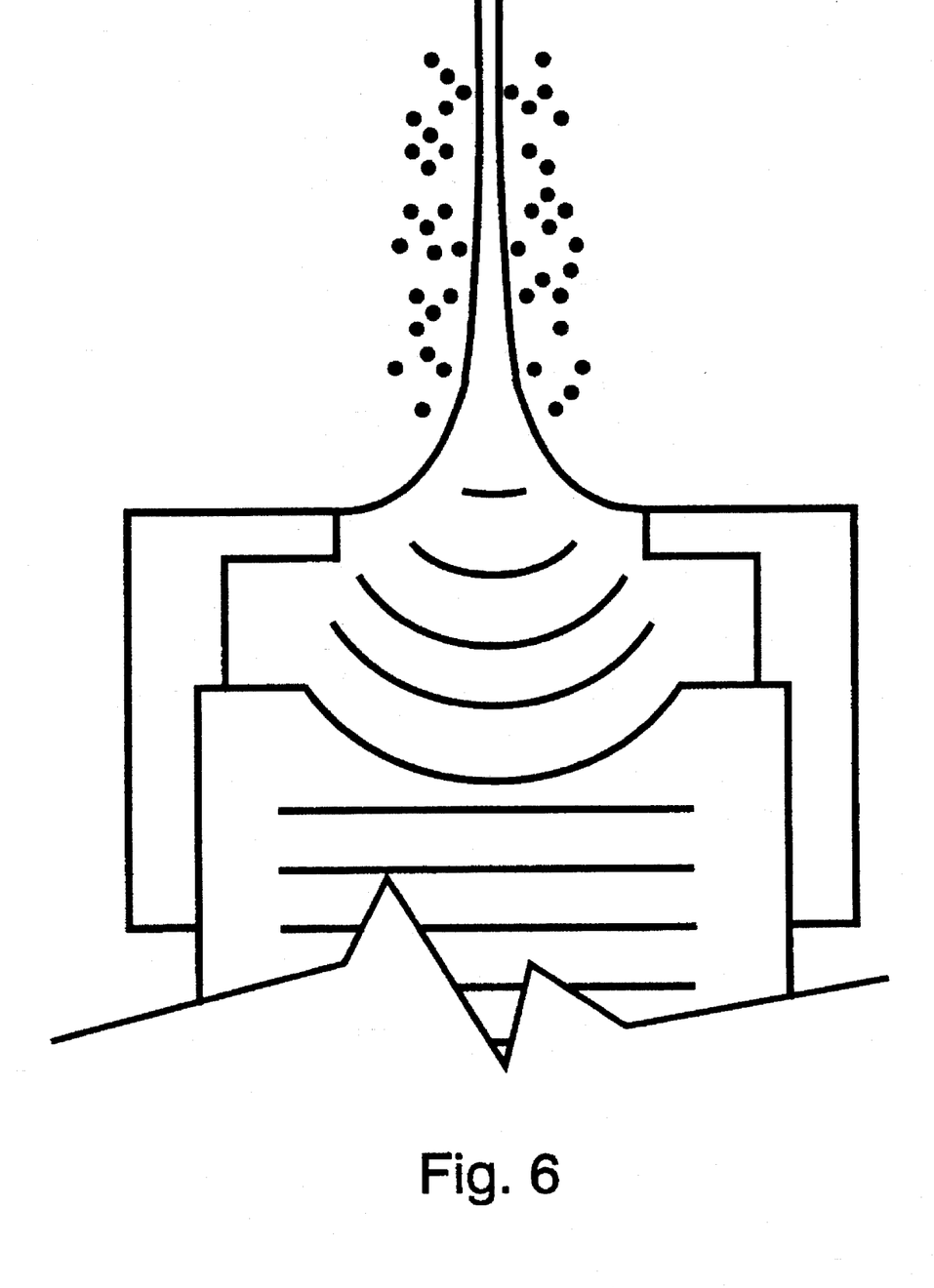
FIG. 6 displays the use of the present invention to produce an acoustic fountain.

For the purposes of the present invention sapphire was used for the buffer rod 210. The spherical focusing lens 200 is positioned at the opposite end of the sapphire buffer rod 210. The lens of the device is submerged below the surface pool 280. The transducer 70 generates a high frequency acoustic tone burst which propagates down the length of the sapphire rod 210. When it reaches the opposing end, the acoustic waves encounter the spherical focusing lens 200, which in turn transmits the acoustic energy into the molten metal pool. The droplet generator 30 relies on acoustic radiation pressure to propel droplets from the small pool of liquid 280. The acoustic radiation pressure may be considered as a DC component of the acoustic pressure. The equation for radiation pressure is:

$$P_r = 2I_i/c$$

where $I_i$ is the intensity of the incident acoustic beam, and c is the acoustic velocity in the liquid. Radiation Pressure of a reflected incident beam has a "Drag Coefficient of =2" assuming a perfectly reflective interface. The pressure acts on the surface at a time interval equivalent to the burst duration. The momentum imparted per unit area in that time is:

$$M = P_r T$$

where T is the burst duration. This radiation pressure is greatest in the beam's focal region, particularly, at the pool surface where wave reflection occurs. The pressure acts to lift a small column of liquid which appears initially as a small mound. When enough energy is applied to overcome surface tension the mound becomes a momentary liquid fountain where each tone burst emits a single droplet. Because the focused beam is diffraction limited, the droplet diameter is proportional to the wavelength. Experimental observations with water indicate that single droplet ejection occurs at a specific power level band where uniformly sized droplets form. However above this band, as one increases power level further the droplets begin to form tails which then break off into satellite droplets. Further increases in power causes the process to transition to a continuous fountain as seen in FIG. 6.

Figure 4:
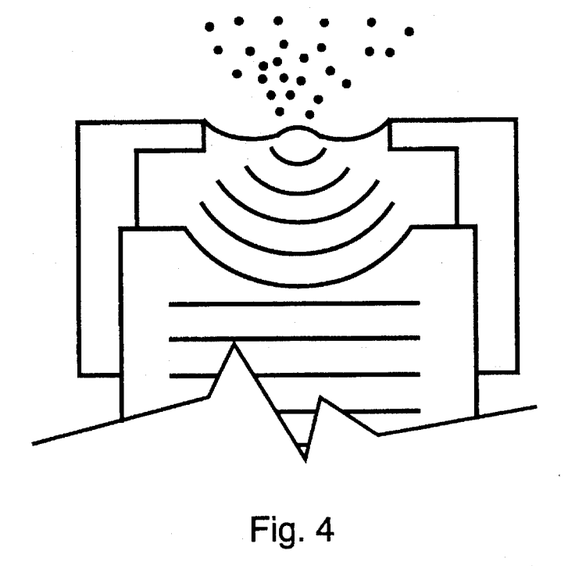
FIG. 4 displays the use of the present invention to produce acoustic misting.

At energy levels just below the threshold of normal droplet ejection, a fine mist may be emitted from the mound at the focus and shown in FIG. 4. The mist size is consistent for droplets generated by capillary waves at that frequency. The mist may be used in situations where it is desirable to coat a surface with fine droplet coating that is 1/10 to 1/100 the size of the normally produced droplets.

Figure 5:
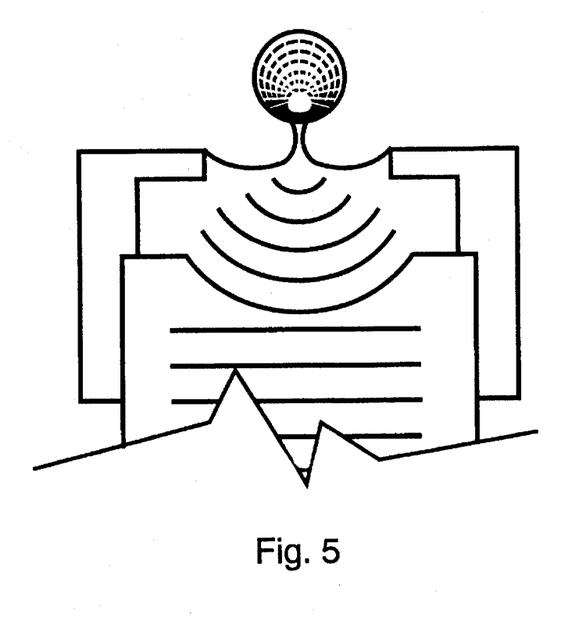
FIG. 5 displays the use of the present invention to produce a drop growing phenomenon.

Large droplets are produced when the ejection threshold power level is at high tone burst repetition rates (20,000 burst per second). A small droplet will suddenly appear to grow rapidly at the ejection point a droplet forms but without sufficient energy to fully separate from the pool as displayed in FIG. 5. Before the droplet can fall back into the pool, under gravity, another tone burst adds more material and energy to the droplet causing it to continue to grow and be suspended by the acoustic radiation pressure until the diameter of the droplet intersects the pool surface and surface tension pulls the droplet back into the pool. The process then repeats itself indefinitely until some operating parameter is changed. The drops are an order of magnitude larger than normal droplets. This phenomenon may be used for the deployment of droplets in microgravity experiments and containerless processing applications.

Fountain ejection can be achieved when the power level is well beyond the normal single droplet ejection range. Fountains appear to be continuous or nearly continuous streams of liquid that eject and break up in a random fashion and produce widely distributed sizes. This mode may be used for producing a spray like coating. This mode cannot be used in concert with the electrostatic system for precise trajectory control due to the wide variations of drop size to electric charge ratios.

In the primary droplet ejection and fountaining modes the process once started is self sustaining. Once ejection occurs any oxide skin or surface contaminants are swept up in the ejection which makes the process effectively self cleaning. In addition, the process exhibits a tendency to be self replenishing. Although an attached reservoir may be actively pumping during the process under low gravity or low head pressure the high surface tension of the metals pool's meniscus acts as a capillary pump that continues to draw fluid into the pool. This capillary action is augmented by the pumping effect of the radiation pressure.

Figure 7:
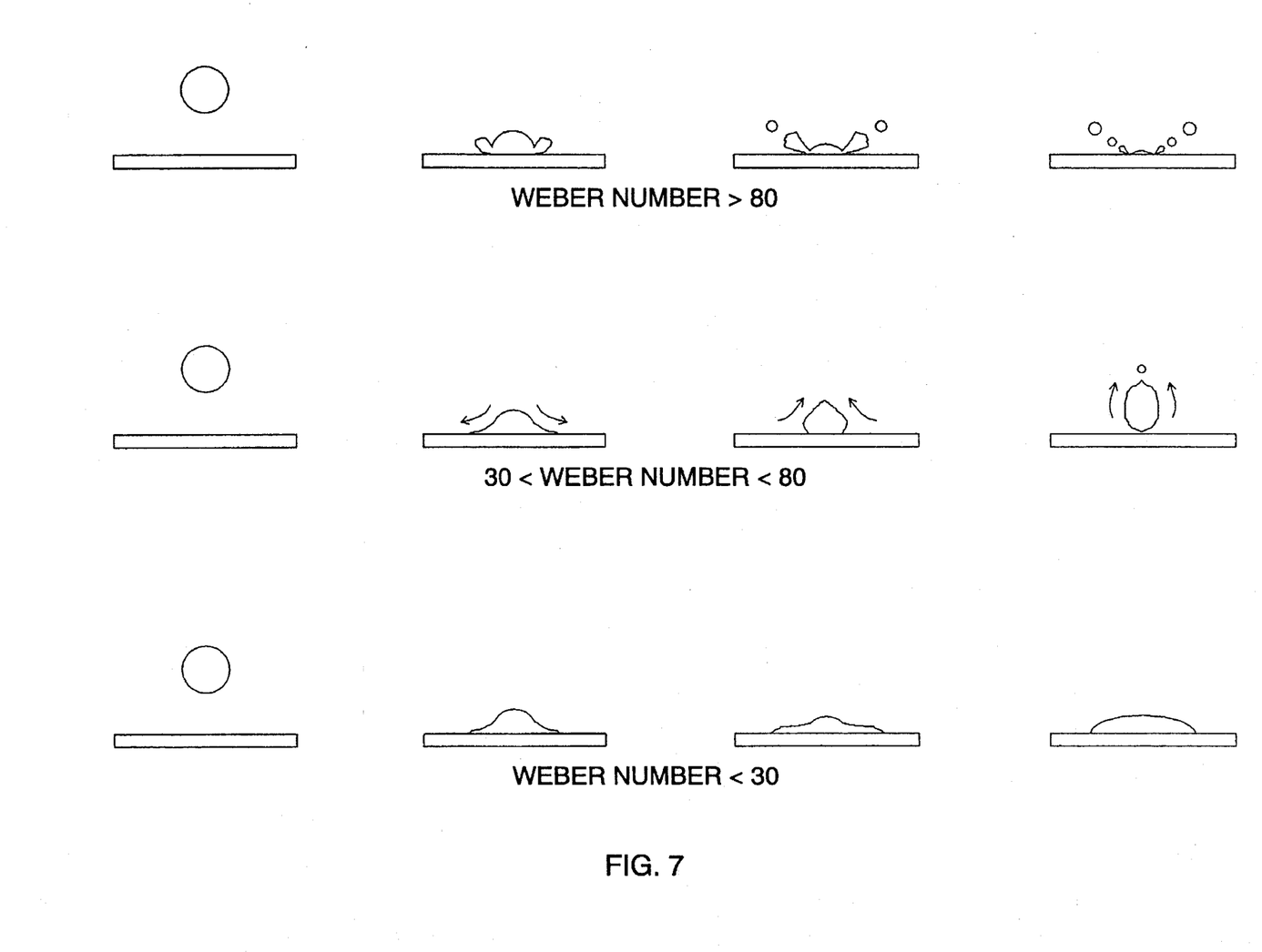
FIG. 7 displays droplet formation using different Weber Numbers.

The DEAP process uses electrostatics as a means of influencing the trajectory of the drops without physical contact. The same principals are used in the common cathode ray tube. A simple charging plate positioned parallel to the pool surface is used as seen in FIG. 7. The pool acts as a opposing plate similar to a capacitor. Therefore, the pool will acquire charge that is opposite that of the charging plate. When a droplet is ejected it carries a isolated charge at point where it breaks off the pool. A small diameter hole in the charging plate permits droplet charging without impeding its path. There is an acceleration experienced by the droplet so that its final velocity will be the combination of initial ejection velocity and an electrostatic acceleration. The charge electrode voltage may be manipulated to accelerate droplets if higher velocity is desired.

Deflection is accomplished in a manner identical to the cathode ray tube. The deflection plates set up an electric field perpendicular to the droplets flight path. An acceleration perpendicular to the path results in a deflected trajectory. By manipulating the deflection voltage in two axes a sweep pattern is formed. The sweep angle should be limited to +/−30 degrees to prevent unacceptably large variations in impact angle. For large areas the electrostatic deflection will be augmented with a droplet generator translation stage.

Thermionic effects at high temperatures will influence the charge and deflection process. In this situation a material held at high temperature may begin to boil off free electrons into the surrounding space. Therefore, at high temperatures additional electrostatic control features may be required to manage these free electrons.

The end objective is to accrete droplets into a single well defined product. The process requires each droplet to impinge upon its accretion target at a specified location, wet the surface, and solidify. A potential problem is droplet splatter which may be tolerated in a 1-g environment but will create unwanted debris in micro-g. Controlling splatter requires control of the parameters that compose the "Weber Number". The Weber Number is a ratio of inertial energy over surface tension energy expressed as:

$$We = paU^2/o$$

Where "a" is drop diameter, "p" is density, "U" is drop velocity and "o" is surface tension. Experimental data indicates that droplet will disintegrate into splatter upon initial impact if the Weber Number is greater than 80 as illustrated in FIG. 7. Droplet rebound after initial impact is another cause of splatter formation. Prevention of rebound was found to require the Weber number be held to less than 30. These numbers however are based on test data where water droplets impinged upon hot surfaces where no wetting occurred due to vapor film formation. Another study investigated droplet impact with surface wetting and viscous forces. This study indicated that viscosity and wetting would permit higher Weber number and thus higher impingement velocities to be used. Solidification may also permit even higher velocities without splatter generation. The discussion, so far, assumes an incident angle of 90° the Weber No. can be increased for those angles.

Droplets less than a millimeter with low velocities easily fall within the Weber number limits indicated. However, in microgravity the practical limits of droplet size ejection may be dramatically extended by using large droplets ejected at relatively slow velocities. Since the nozzleless droplet generator can generate a range of droplet sizes by frequency control and by the drop growth phenomenon previously described, micro-gravity permits DEAP to operate with parameters that would be impractical 1-g.

Once a droplet impinges and wets the solid surface the solidification will depend on the droplets initial temperature at impact, target surface temperature and heat, transfer properties. Heat transfer must be great enough to solidify the droplet before another droplet is deposited on the same location. If the droplet remains liquid too long it will splatter when subsequent droplets strike it. However, an excessively high solidification rate would produce a rough surface and create frequent voids. High density (90% or greater) and good bonding are essential in producing a usable end product.

The thermal conditions of the process must be monitored so that the accretion product temperature remains within an operating band that is favorable for proper accretion. If the temperature of the accretion mass becomes too high, the process can be halted until it has cooled enough to resume accretion. Conversely, should the temperature become to low the droplet temperature may be raised by increasing heat flux at the ejection pool. Since the charge and deflection system permits control of droplet placement, the placement pattern may be adjusted to prevent hot spots and surface pools from forming. By laying down material in patterns that optimize temperature distribution, one may insure that accretion is occurring in a consistent manner. A typical droplet diameter is about 35 microns. This droplet would spread to roughly three times that diameter on impact with a typical droplet rate of 10,000 drops per second. It takes approximately 62 minutes to accrete a single square inch of material roughly 0.25 inch thick. As described previously, the use of a capillary action of a meniscus in combination with acoustic radiation pressure to drive the replenishment of the droplet generator would constitute an entirely new technique that virtually eliminates all moving parts.

The control system maintains conditions to assure the Weber No. values are appropriate for splatter free accretion for various combinations of droplet size and velocity. It also maintains thermal and impact parameters to assure appropriate drop spreading and wetting for the various Weber Number values.

Figure 8:
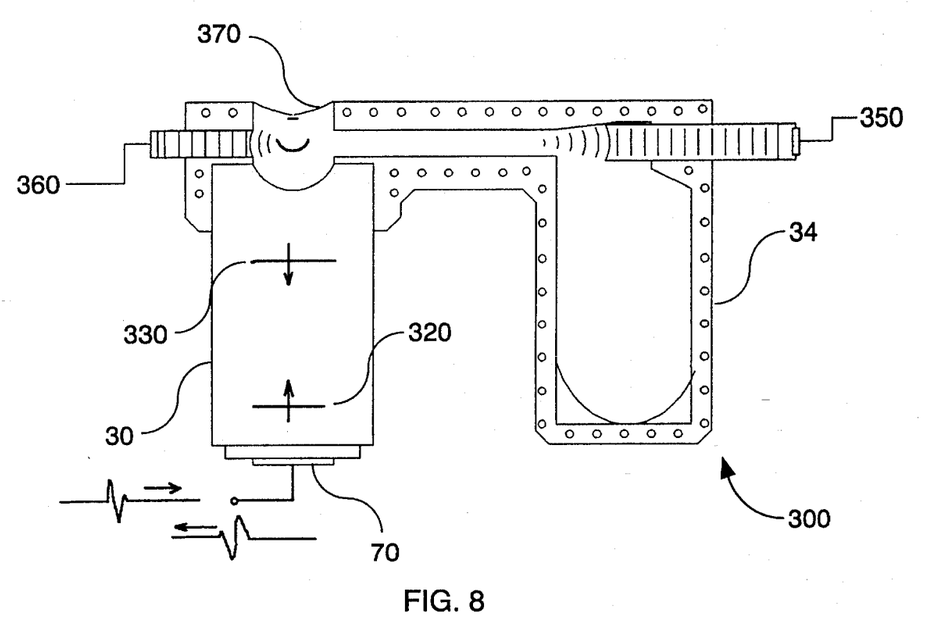
FIG. 8 displays the use of pool level control using acoustic depth sensing.

FIG. 8 displays the use of pool level control using acoustic depth sensing. In FIG. 8 a molten metal supply 40 houses liquid metal that is used to supply the molten that is used to supply to supply the molten liquid reservoir 280. The reservoir 280, contains a pool meniscus 370 that has to be maintained at a certain level. The transducer 70 can be used to determine the depth of the liquid metal reservoir 280. The transducer 70 produces an emitted acoustic pulse 320 which reflects off of the surface 280. The depth echo pulse 330 is then reflected back to the transducer 70 which emits an electrical pulse enabling the control system to gauge the depth of the molten reservoir 280. The control system manipulates a pool filling transducer 350 and a pool draining transducer 360 which adjust the liquid molten pool reservoir using acoustic radiation pressure.

Figure 9:
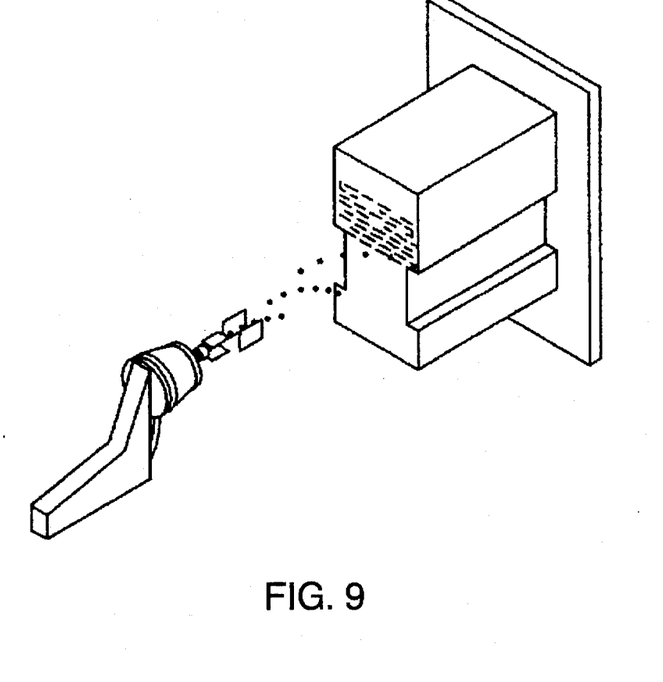
FIG. 9 displays an example of a single axis target type.
Figure 10:
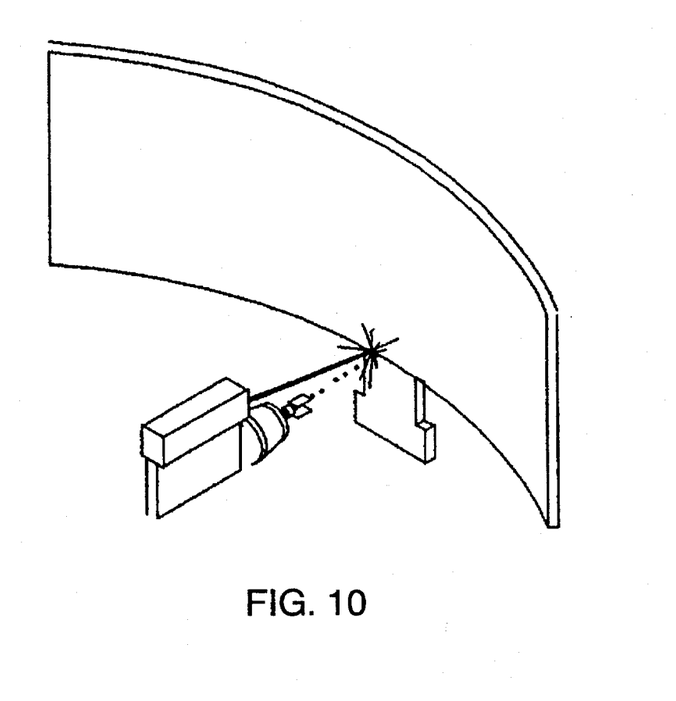
FIG. 10 displays an example of a metal sheet target type.
Figure 11:
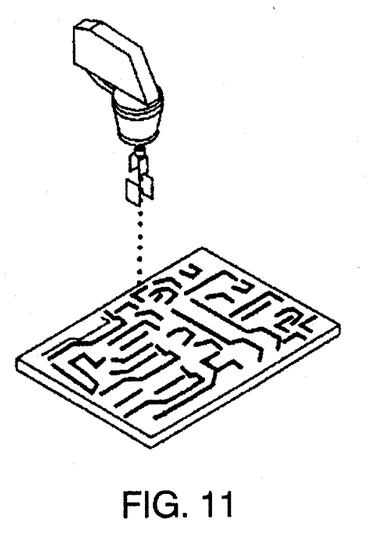
FIG. 11 displays an example of a current board target type.
Figure 12:
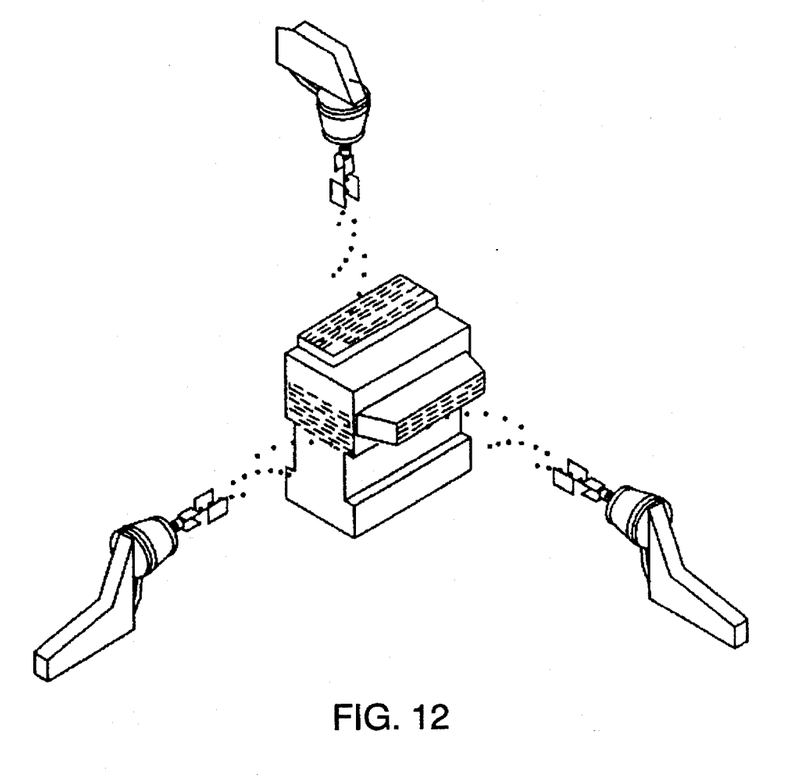
FIG. 12 displays an example of a multi-axis target type.
Figure 13:
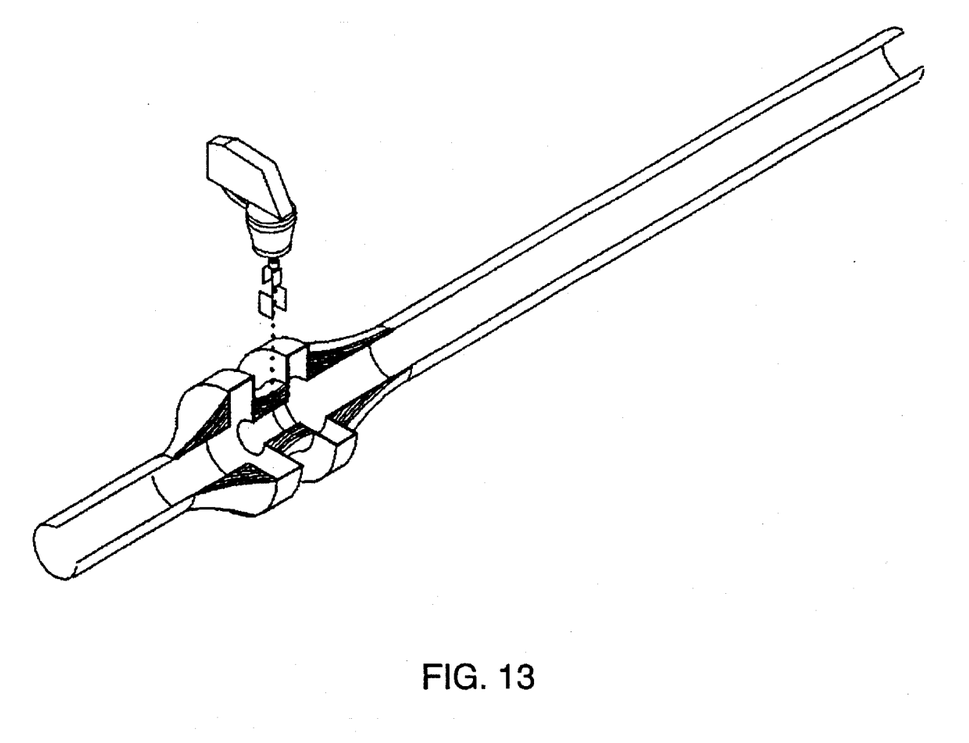
FIG. 13 displays an example of a tubular target type.

Typical applications for Directional Electrostatic Accretion Process Employing Acoustic Droplet Formation are shown in FIGS. 9 through 13. In its simplest form the target may be a fixed plate capable of withstanding the elevated temperature of the molten metal droplets impinging upon its surface as shown in FIG. 9. The target may be a metalized film or sheet metal constructed to serve as a means of predefining certain surfaces that then become an integral part of the product as displayed in FIG. 10. FIG. 11 displays the present invention being used to perform circuit board conductor deposition. FIG. 12 displays multi-axis accretion. Lastly FIG. 13 displays reinforcement of thin sheets and tubular structures using the present invention.

The target may also be an existing metal product that is to be modified or have feature added. It may also be two or more component pieces in which DEAP provides the joining filler material in a welding or soldering operation. The target must be electrically connected to the rest of the system so one can control the electrostatic charge accumulation due to the accretion of charged droplets.

For the majority of applications the process must be performed in an inert atmosphere or preferably a vacuum. This prevents the formation of oxides on the droplet, target and product surfaces which would impede proper bonding and reduce the overall strength of the product. This is why the inventor believes this process to be naturally compatible with the vacuum environment of Space.

ALTERNATE EMBODIMENTS

The droplet generator may employ a number of droplet generation techniques. DEAP may use nozzle based droplet generators to create droplets by ejecting the liquid from an orifice which is oscillated with pressure pulses or acoustic vibrations. The nozzle orifice is used to define the droplet size. DEAP may also employ non-nozzle based techniques where droplets are produced by highly focused submerged acoustic devices that produce acoustic radiation pressure to cause droplets to be ejected from a liquid pool. Alternate non-nozzle embodiment is the formation of droplets by inducing high amplitude capillary waves on the surface pool.

The introduction of acoustic energy into the droplet generator may be accomplished by using piezoelectric devices that convert electrical signals into acoustic waves. One may employ magnetorestrictive devices for the same proposes when employing lower frequencies. Alternatively, one may also induce acoustic waves in a non-contact manner using pulsed lasers or other energy beam methods.

The droplets could be ejected and impinge upon a accretion target without intervention, however the electrostatic deflection system provides the high level of controllability desired to achieve a precisely formed product. The electrostatic system may employ an electrode near the droplet ejection point so that the droplet acquires a charge where the droplet generator as a whole may be held at a potential different from that of the other parts of the system so that any droplet emitted will also have that potential and be influenced by the electrostatic deflection plates. Where needed, and additional electrode may be used to provide additional droplet velocity control by accelerating and decelerating droplets before passing between the deflection field plates. This would be useful when ejecting droplets over long distances in 1 g.

The apparatus may be provided with a translation or rotating motion capability such that can reorient the accretion product of permit accretion along different axes or to expand the accretion product size capability by moving the product so the greater surface area can be covered by the otherwise limited electrostatic deflection range. For circular or tubular forms, a rotating target may be used to define the diameter of the accretion product while the electrostatic deflection serves to define the radial thickness of the product. Manipulation of the target voltage may also serve as another means of controlling the droplet trajectory in the vicinity of the product. One embodiment would be the elimination of electrostatic control altogether in situations where it may be more desirable to use translation and rotation stages to move the droplet generator, the accretion target, or both to control the accretion process. Alternatively, it would be most advantages to use translation and rotation control in conjunction with electrostatic trajectory control to provide both coarse and fine droplet placement over large areas.

What is claimed:

1. A method of generating liquid metal droplets from a nozzleless apparatus comprising a cavity, an acoustic lens focused to a point and coupled to said cavity, a buffer rod coupled to said acoustic lens and a piezoelectric device coupled to said buffer rod, said method comprising the steps of;

placing said nozzleless apparatus in a vacuum, supplying molten metal liquid to said cavity, maintaining a fixed quantity of said molten metal liquid in said cavity by utilizing said piezoelectric device to perform acoustic depth sensing, and transmitting an acoustic wave through said buffer rod, to said acoustic lens, thereby generating said liquid metal droplet.

2. A method producing metal droplets in a nozzleless apparatus comprising an acoustic lens coupled on a first side to a free surface pool of molten metal and on an oppositely disposed side to a buffer rod, a piezoelectric transducer connected to said buffer rod, and a tonal burst generator connected to said piezoelectric transducer: said process comprising the steps of:

transmitting electrical energy from said tonal burst generator to said piezoelectric transducer, utilizing said piezoelectric transducer to convert said electrical energy to acoustic energy, transmitting said acoustic energy from said buffer rod to said acoustic focusing lens, producing metal droplets by transmitting said acoustic energy through said acoustic focusing lens to said free standing pool of molten metal.

3. A method for producing fountain ejection in a nozzleless apparatus comprising an acoustic lens coupled on a first side to a free surface pool of molten metal and on an oppositely disposed side to a buffer rod, a piezoelectric transducer connected to said buffer rod, and a tonal burst generator connected to said piezoelectric transducer; said process comprising the steps of:

(a) transmitting electrical energy in the form of a tonal burst from said tonal burst generator to said piezoelectric transducer, (b) utilizing said piezoelectric transducer to convert said electrical energy to acoustic energy, (c) transmitting said acoustic energy from said buffer rod to said acoustic focusing lens, (d) producing a metal droplet by transmitting said acoustic energy through said acoustic focusing lens to said free standing pool of molten metal, (e) repeating steps (a) through (d) thereby producing said fountain ejection.

* * * * *